United States Patent

[11] 3,559,884

| [72] | Inventors | Charles C. Visos;<br>John J. Love, St. Louis, Mo. |
|---|---|---|
| [21] | Appl. No. | 800,596 |
| [22] | Filed | Feb. 19, 1969 |
| [45] | Patented | Feb. 2, 1971 |
| [73] | Assignee | Emerson Electric Co.<br>St. Louis, Mo.<br>a corporation of Missouri |

[54] GAS VALVE
6 Claims, 10 Drawing Figs.

| [52] | U.S. Cl. | 236/80,<br>137/489; 236/15 |
|---|---|---|
| [51] | Int. Cl. | F23n 5/04 |
| [50] | Field of Search | 236/15A,<br>80, 85; 137/489 |

[56] References Cited
UNITED STATES PATENTS

| 3,227,370 | 1/1966 | Houser | 236/80X |
| 3,360,198 | 12/1967 | Katchka | 236/80 |
| 3,260,459 | 7/1966 | Caparone et al. | 236/80 |
| 3,433,409 | 3/1969 | Jackson et al. | 236/80X |

*Primary Examiner*—William E. Wayner
*Attorney*—Charles E. Markham

ABSTRACT: A manifold gas valve having a biased closed fluid-pressure-operated main valve, in which unregulated supply line pressure is applied to both sides of the valve operator, and in which a single pressure regulator operates to maintain a predetermined bleedoff rate from one side of the valve operator and to maintain a predetermined flow to a pilot burner under conditions of varying supply line pressure.

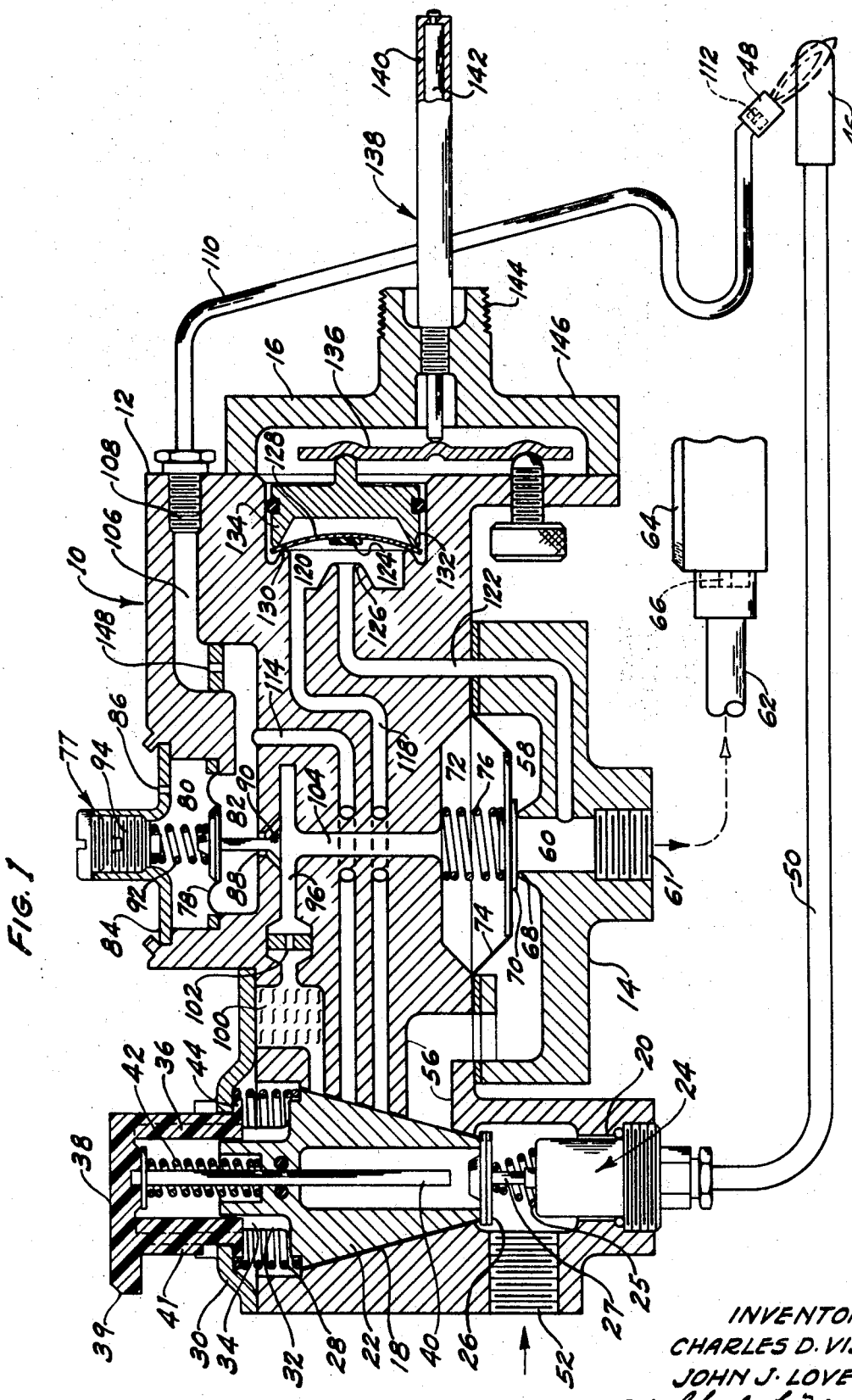

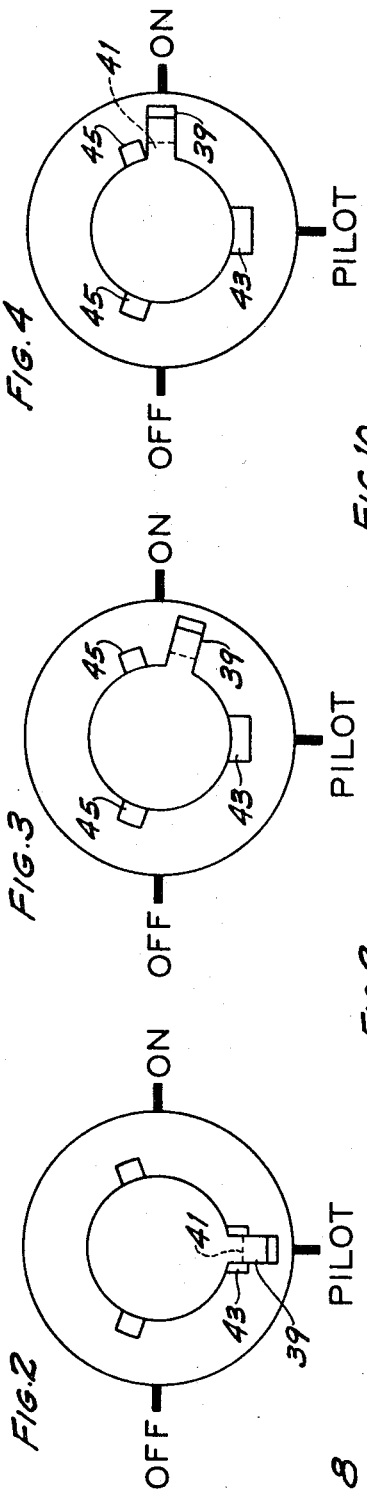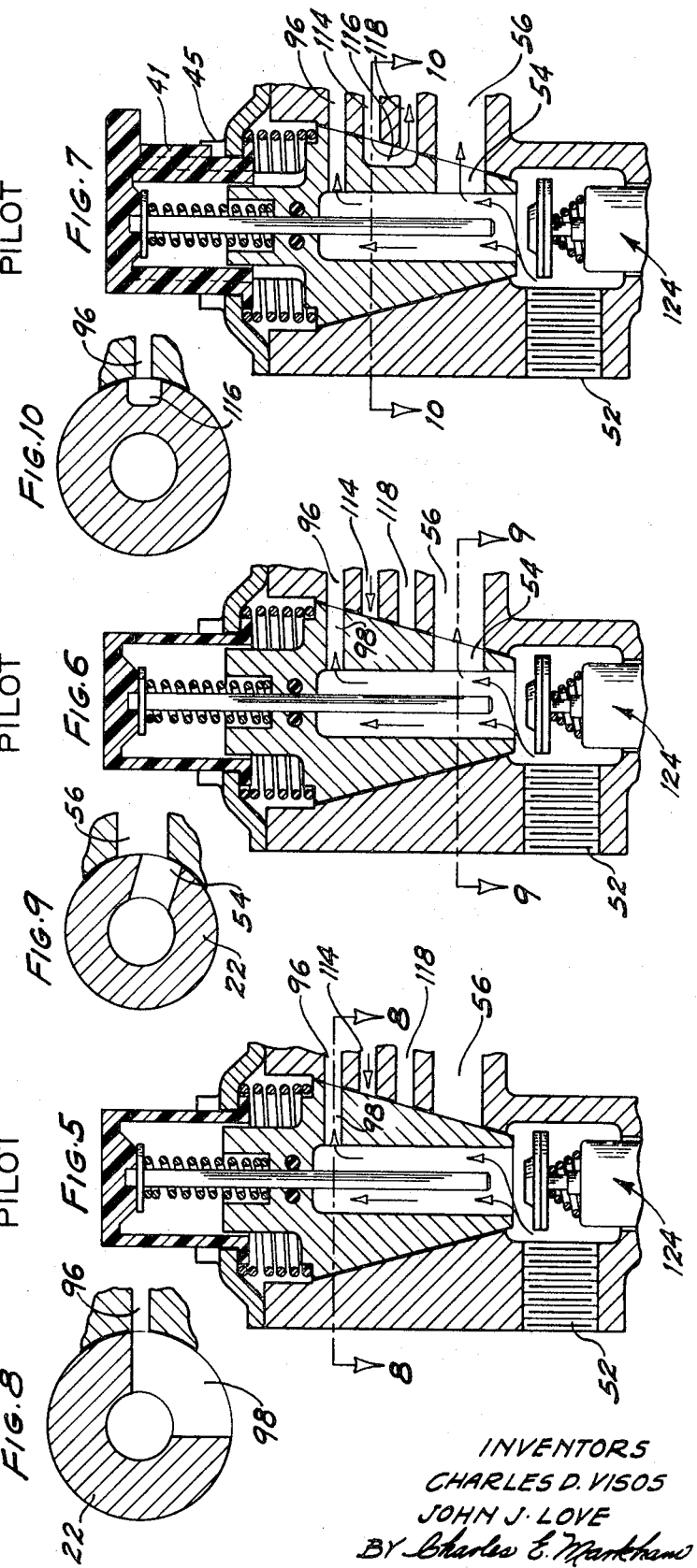

GAS VALVE

This invention relates to gas valves for controlling the operation of gas burners, and particularly to manifold gas valves which include a manual cock, a safety shutoff valve, a fluid-pressure-operated main cycling valve, and pressure-regulating means.

An object of the invention is to provide a generally new and improved manifold gas valve incorporating a manual cock, a safety shutoff valve, a fluid-pressure-operated main cycling valve, and a pressure regulator.

A further object is to provide a gas valve having main and pilot burner fuel passages and a biased closed fluid-pressure-operated valve controlling the main fuel passageway, in which line pressure is applied to both sides of the main valve operator thereby to permit the valve to remain closed, in which supply line pressure is bled off from one side of the valve operator at a greater rate than it is supplied thereto thereby to effect opening of the valve against its bias, and in which a single pressure regulator functions to regulate the bleedoff rate from the one side of the valve operator and to regulate the flow through the pilot burner passageway so as to maintain a predetermined flow of gas to main and pilot burners under conditions of varying supply line pressure More specifically, it is an object to provide a gas valve device having a biased closed fluid-pressure-operated valve controlling a main fuel passageway leading to a main burner, in which gas at supply line pressure is applied to both sides of the main valve operator to hold the valve closed and is bled off from one side of the valve operator through a bleed passageway at a greater rate than it is supplied thereto, thereby to effect an opening movement of the valve against its bias, in which the bleed passageway is branched and communicates through one branch with a pilot burner and through another branch with the main fuel passageway at a point downstream from the main valve, and in which a single pressure regulator regulates the flow through the bleed passageway at a point between the one side of the valve operator and the junction of its branches, thereby to maintain a predetermined flow of gas to the main and pilot burners under conditions of varying supply line pressure.

Further objects and advantages will become apparent from the following description when read in connection with the accompanying drawings.

In the drawings:

FIG. 1 is a longitudinal cross-sectional view of a manifold gas valve constructed in accordance with the present invention, and shown schematically in association with a main and pilot gas burner.

FIGS. 2 to 4 are top plan views of the manual plug cock knob in its "pilot," "intermediate," and "on" positions, respectively;

FIGS. 5 to 7 are longitudinal cross-sectional views of the manual plug cock in its "pilot," "intermediate," and "on" positions, respectively; and FIGS. 8 to 10 are transverse cross-sectional views of the plug cock taken along lines 8-8, 9-9, and 10-10 of FIGS. 5, 6, and 7, respectively.

Referring to the drawings, a valve body is generally indicated at 10, comprising a main section 12, a lower outlet section 14, and a mounting section 16. The sections 14 and 16 are suitably connected to the main section 12. The main body section 12 is provided with a vertical tapered bore 18 converging downwardly from the upper surface thereof and a concentric straight bore 20 extending upward from the lower surface thereof. The tapered bore 18 has fitted therein a hollow tapered rotary plug cock 22, and the straight bore 20 receives an electromagnetic cutoff valve device 24. The cutoff valve device 24 includes a disc valve 26 biased in seating engagement with the lower end of the hollow tapered plug cock 22 by a spring 25.

The tapered plug valve is biased downward in tapered bore 18 by a spring 28 between the upper end of the tapered plug portion and a cover member 30 suitably attached to the main body section 12. At its upper end tapered plug valve 22 is provided with a cylindrical portion 32, having axial grooves 34 in the surface thereof which receive internal splines 36 formed in a hollow cylindrical knob 38. The fit of the splines 36 in the grooves 34 is free, so that the knob is axially slidable on the upper cylindrical portion of the plug valve. A pin 40 attached at its upper end to the knob 38 and slidably fitting an axial bore in the upper cylindrical portion of the plug valve extends downward through the hollow portion and is adapted to engage the valve 26 when the knob 38 is pressed downward. A spring 42 biases the knob 38 upward and a flange 44 at the lower end of knob 38 limits its upward movement.

The knob 38 is provided with a pointer 39, and the cover 30 is provided with "off," "pilot," and "on" indicia, see FIGS. 2 to 4. The knob 38 is further provided with an axial spline 41 on its outer surface below pointer 39, and cover 30 is provided with a reentry notch 43, aligned with the indicated pilot position, which permits passage of the spline 41 and downward movement of the knob 38 only when the knob is in pilot position. The cover is further provided with stops 45 which are engaged by the spline 41 and thereby prevent rotation of the plug valve beyond "on" and "off" positions.

The electromagnetic valve device 24 further includes an electromagnet, and the valve 26 has an armature attached to the lower end of its stem 27 which, when the valve 26 is moved downward sufficiently off of its seat by push rod 40, engages the electromagnet and is held in an engaged position when the electromagnet is sufficiently energized, thereby holding valve 26 open. Electrical energy for energizing the electromagnet is generated at a thermocouple junction 46 heated by the flame of a pilot burner 48. The thermocouple junction is connected to the electromagnet by coaxial conductors 50.

The threaded inlet passage 52 is formed in the left-hand side of the main section of the valve body and intersects the vertical bore 20. The inlet 52 is screw threaded for connection of a supply conduit. The rotary plug valve 22 has a main port 54 therein, see FIGS. 6, 7, and 9, which, when the plug valve is rotated to "on" position, registers with a passage 56 formed in the main valve body section. The passage 56 leads to a cavity 58 formed in the lower outlet section of the valve body. A main burner outlet passage 60 leading from cavity 58 to the exterior has a threaded portion 61 for connection to a conduit 62 leading to and connected to a main burner indicated at 64. The main burner is provided with the usual fuel metering orifice 66.

A valve seat is formed around the outlet passage 60 and a disc valve 70 cooperates with seat 68 to control the flow from the cavity 58 to the main burner 64. A cavity 72, opposed to cavity 58, is formed in the main valve body section 12, and the disc valve 70 is connected to and is movable with the central portion of a flexible diaphragm member 74 held at its periphery between the upper and lower valve body sections. The diaphragm member 74 provides a common flexible wall forming with the opposed cavities lower and upper chambers 58 and 72, respectively, and constitutes a fluid-pressure-responsive operator for main valve 70. The central portion of diaphragm member 74 is biased downward, and the valve 70 is biased on its seat 68 by a spring 76.

The device includes a pressure regulator, generally indicated at 77, comprising a cavity formed in the upper surface of the main valve body section, which cavity is divided by a flexible diaphragm member 78 into upper and lower chambers 80 and 82. The upper chamber 80 is further defined by a cover member 84 having an atmospheric vent 86 therein. The bottom of the lower chamber 82 has a port 88 formed with an inverted valve seat controlled by a valve 90 which is connected through a stem to the central portion of the diaphragm member 78. A spring 92 biases the valve 90 toward an open position with respect to its seat. The upper end of spring 92 bears against an adjustment screw 94, whereby the downward bias of valve 90 is rendered adjustable.

A passage 96 provides communication between the lower pressure regulator chamber 82 and the tapered bore 18. A port 98 in the hollow tapered plug valve 22, see FIGS. 5 to 8, provides communication between the passage 96 and the interior hollow plug valve. A chamber containing a filter 100 and a chamber containing an orifice member 102 are interposed in the passage 96 between the chamber 82 and the tapered bore 18. A vertical passage 104 provides communication between the interior of plug valve 22 and the main valve chamber 72 via the passage 96 and plug valve port 98. A passage 106 leading from the pressure regulator chamber 82 to a pilot burner outlet 108 and a conduit 110 connected in outlet 108 and leading to the pilot burner 48 complete communication between the interior of hollow plug valve 22 and the pilot burner via the pressure regulator. The pilot burner 48 is provided with the usual fuel metering orifice 112.

Communication between the main valve operator chamber 72 and the main burner outlet passage 60 via the pressure regulator to permit bleed off from chamber 72 is provided and comprises the passage 104, the pressure regulator port 88, the passage 106, a passage 114 leading from passage 106 to the tapered bore 18, a groove 116 in tapered plug valve 22, see FIGS. 7 and 10, a passage 118 to a chamber 120, and through a passage 122 to the main burner outlet passage 60. Communication between chamber 120 and passage 122 is controlled by a valve 124, which cooperates with a valve seat 126 formed around the intersection of passage 122 and the wall of chamber 120.

The valve 124 is attached to a spring metal circular clicker disc 128 bearing at one side near its periphery against an annular rim portion 130 formed in the chamber 120 and is engaged at its other side, closer to its periphery, by an annular edge 132 formed on a circular operating member 134 axially slidable in chamber 120. The disc 128 is shown in a stressed condition with its concave side facing the valve seat 126. When the slidable operating member 134 is permitted to move outward; that is toward the right, the disc will snap through a planar form to an opposite concavo-convex form, which is its free form. In this free form position, the convex side of the disc faces the valve seat 126 and the valve 124 is moved into engagement with the seat, thereby interrupting communication through passages 118 and 122. The operator 134 is moved axially in chamber 120 through a lever 136 by a rod and tube thermostatic device 138 comprising a tube 140 and a rod 142 disposed in the space or medium to be heated by main burner 64.

The tube 140 of the rod and tube device is threadedly engaged in an internally threaded axial bore extending through an externally threaded mounting boss 144 on the mounting section 16 of the valve body. The mounting section 16 further includes a cover portion 136 which encloses the chamber 120 and lever 136 and is suitably attached to the main section 12 of the valve body. The passage 106 is provided with an orifice member 148 positioned between the junction of 114 and the pilot burner outlet 108.

OPERATION

The valve device is shown in FIG. 1 in a cold shutoff position. That is to say, the hollow rotary plug cock 18 is in an "off" position, thereby cutting off all communication between the inside of the hollow plug and passages 96 and 56 as well as breaking communication between bleed passages 114 and 118, and the shutoff valve 26 is in engagement with the lower open end of the hollow plug valve, thereby cutting off communication between the fuel supply inlet 52 and the interior of the plug valve. Also, the rod 140 of the rod and tube device is in a cold contracted position, thereby forcing the disc 128 into the position shown, with its concave side facing the valve seat 126 and the valve 124 in an open position.

Under these conditions, when it is desired to operate the main and pilot burners, the knob 38 is rotated counterclockwise from an "off" position to a "pilot" position, as indicated by the pointer 39 on the knob and as shown in FIGS. 2, 5, and 8. In this position, the upper port 98 in the plug valve registers with the passage 96, which opens communication between the pilot burner and the interior of the plug valve 22. The knob 38 is now pressed downward, causing valve 26 to be opened, thereby admitting fuel to the interior of plug valve 22 and therefore to pilot burner 48. The pilot burner is now ignited, and the knob 38 is held in this downward position until sufficient energy is generated at thermocouple junction 46 to effect the holding open of valve 26 by electromagnetic attraction.

When the electromagnetic valve 24 is sufficiently energized to remain open, the knob 38 is released to return upward under bias of spring 42, thereby removing spline 41 from cover notch 43. The knob 38 is now turned counterclockwise toward "on" position. As the knob and plug valve approach the "on" position, a portion of the port 54 in the lower portion of plug valve 22 will move into registry with passage 56, thereby admitting gas at supply line pressure to chamber 58 below the operator diaphragm 74. This will not, however, cause main valve 70 to open, because the bleedoff rate to the pilot burner is not sufficient to drop the pressure above operating diaphragm 74 to a point which will permit line pressure below the diaphragm to open the valve 70 against biasing spring 72. However, as the knob 38 is rotated farther counterclockwise, to the "on" position shown in FIGS. 4, 7, and 10, the groove 116 in the surface of plug valve 22 will be moved into registry with the ends of passages 114 and 118, thereby completing communication between the chamber 72 and the main outlet passage 60 via the pressure regulator. Completion of this communication permits a bleedoff rate of the pressure being applied above operating diaphragm 74, which results in an opening movement of valve 70 due to the substantially greater supply line pressure being applied below the diaphragm 74. Gas will now flow to main burner 64 through metering orifice 66 where it is ignited by the pilot burner 48.

Pressure regulator 77 maintains a substantially constant gas pressure on the upstream side of the main and pilot burner metering orifices 66 and 112, as predetermined by adjustment of the regulator spring 92, so long as supply line pressure is somewhat above the pressure to be maintained. The orifice in the orifice member 102 in passage 96 is calibrated, in connection with the main and pilot burner metering orifices being used, to provide a suitable range of control by the regulator and is preferably increased or decreased in size with any substantial increase or decrease in the size of the main and pilot burner metering orifices. It is to be understood that orifice member 102 is a calibrated restriction and that any suitable means of restricting the flow through passage 96 will serve the purpose in lieu thereof, such as, for example, a reduced diameter portion of the passage 96.

When the space or medium to be heated by main burner 64 reaches a temperature sufficient to effect an elongation of tube 140 which will permit snap disc 128 to snap over center and close valve 124 on its seat 126, the bleedoff to outlet passage 106 will be cut off. This will again permit the pressure above operator diaphragm 74 to increase sufficiently to effect with spring 76 the closure of valve 70. Again, as the space or medium cools due to inoperation of the main burner, the tube 140 will contract, causing valve 124 to be opening and permitting a bleedoff which will open valve 70. The main burner 64 will thus be operated "on" and "off" in normal operation until the plug valve 22 is rotated clockwise to a closed position.

If, for any reason, the pilot burner is extinguished during operation, the thermocouple junction will cool and the electromagnetic safety cutoff valve 24 will become deenergized and close, thereby cutting off all flow of gas at a point adjacent the inlet to the device. The orifice in passage 106 is a safety means provided to preclude the inadvertent bleedoff of pressure above main valve operator diaphragm 74 through the pilot outlet 108 over an amount which will pass the pilot metering orifice 112. Such inadvertent bleedoff could possibly occur due to leaky connections or leaky conduit between pilot outlet 108 and the pilot burner metering orifice and may, if sufficient, cause valve 70 to remain open or partially open even though the thermostatically operated cycling valve 124 is closed. This would cause overheating of the medium or space. The orifice 148 is sized just sufficiently larger than the pilot burner metering orifice to avoid appreciably restricting the flow to the pilot burner, but small enough to preclude a bleedoff which would result in any opening movement or leakage around valve 70 even though the pilot burner is disconnected.

The arrangement by which communication between the interior of the hollow plug valve and chamber 58, via the port 54 and passage 56, is established before communication between bleedoff passages 114 and 118 is established, via groove 116, as the plug valve is turned toward an "on" position, is a safety provision. This provision precludes the occurrence of a hazardous condition, which may otherwise occur in an arrangement in which groove 116 and port 54 are intended to be aligned and opened simultaneously but which, due to manufacturing tolerances or some leakage, permit a communication between passages 114 and 118 before port 54 is sufficiently opened. Under such conditions, if the plug valve is not turned to a fully "on" position by the operator, some fuel may flow through the bleedoff passages and possibly some through a partially opened main valve 70 which, in total, would not be sufficient to provide proper ignition of the main burner.

When, on the other hand, as in the present arrangement, adequate flow to chamber 58 is established before any bleedoff occurs, the main valve 70 will be opened immediately a sufficient amount for ignition as the plug valve is turned to "on" position and communication between the bleedoff passages occurs, and if the plug valve is not turned to fully "on" position, the main valve 70 will remain completely closed. It will be understood that the bleed passages and the groove 116 are quite small, compared to port 54 and passage 56, so that only a relatively slight rotary movement of the plug valve will establish or cut off the bleedoff through groove 116. The possibility, therefore, that the plug valve would be inadvertently moved to a position in which partial but inadequate bleedoff would occur to permit a sufficient opening of main valve 70 for proper ignition is quite remote.

The foregoing description and the drawings are intended to be illustrative and not limiting, the scope of the invention being set forth in the appended claims.

We claim:

1. A valve device operative to supply gas at a substantially constant predetermined pressure to the metering orifices of main and pilot gas burners, the device comprising a valve body having an inlet passage, a main burner outlet passage, a pilot burner outlet, and a valve chamber connecting said inlet and main burner outlet passages, a biased closed main valve in said chamber controlling the flow from said inlet passage to said main burner outlet passage and including a fluid pressure responsive actuator operative to open said valve when a greater fluid pressure is applied to one side thereof than to the other, one side of said actuator being in free communication with said inlet passage, a restricted passage providing limited communication between said inlet passage and the other side of said actuator, a bleedoff passage leading from said other side of said valve actuator to said main burner outlet passage, a pressure regulator controlling the flow through said bleedoff passage, a thermostatically operated valve controlling the flow through said bleedoff passage at a point between said pressure regulator and said main burner outlet passage, and a branch passage connecting said pilot burner outlet with said bleedoff passage at a point between said pressure regulator and said thermostatically operated valve, and said restricted passage being calibrated to permit sufficient flow from said inlet passage to said other side of said valve actuator to hold said main valve closed and to maintain a predetermined pressure at the metering orifice of a pilot burner connected to said pilot outlet when said thermostatically operated valve is closed while yet restricting the flow sufficiently to cause said main valve to open when said thermostatically operated valve is open.

2. A valve device as set forth in claim 1, in which said branch passage connecting said pilot outlet with said bleedoff passage is sufficiently restrictive to prevent a bleedoff therethrough which will cause said main valve to open when said thermostatically operated valve is closed, yet permits sufficient flow therethrough to maintain said predetermined pressure at the metering orifice of a pilot burner connected to said pilot outlet.

3. A valve device as set forth in claim 1 which further includes a manually operated valve controlling the flow through said bleedoff passage at a point therealong between the junction therewith of said branch passage and said main burner outlet passage.

4. A valve device as set forth in claim 1 in which said thermostatically actuated valve includes means effecting a snap action operation thereof between closed and open positions.

5. A valve device as set forth in claim 1 which further includes a manual valve having a first portion thereof operative to control flow through said inlet passage and a second portion thereof operative to control flow through said bleedoff passage, which valve portions are arranged with respect to said passages so that both passages are closed when said valve is moved in one direction to a closed position and so that said inlet passage is at least partially opened before any opening of said bleedoff passage occurs as said valve is moved in an opposite direction toward an open position.

6. A valve device as set forth in claim 1 which further includes a manual valve having a first portion thereof operative to control the flow through said inlet passage at a point therealong upstream from the intersection therewith of said restricted passage, a second portion thereof operative to control the flow through said bleedoff passage, and a third portion thereof operative to control the flow through said restricted passage, said valve portions being arranged with respect to said passages so that when said valve is moved in one direction to a closed position all flow through said passages is cut off and so that when said valve is moved in an opposite direction from said closed position said restricted passage, said inlet passage, and said bleed passage are sequentially opened in that order.